United States Patent [19]

Maki et al.

[11] 4,260,264
[45] Apr. 7, 1981

[54] BIAXIAL VENT EXTRUDER

[75] Inventors: Yoshiki Maki, Hiroshima; Atsushi Idemoto, Kure; Norimasa Oda, Hiroshima, all of Japan

[73] Assignee: The Japan Steel Works Ltd., Tokyo, Japan

[21] Appl. No.: 41,465

[22] Filed: May 22, 1979

[51] Int. Cl.$^3$ .............................................. B29B 1/10
[52] U.S. Cl. ........................................ 366/75; 366/76; 366/85; 366/139; 366/143; 366/301
[58] Field of Search ....................... 366/75, 83, 85, 84, 366/88, 89, 90, 296, 300, 301, 319, 77, 76, 97, 143, 139; 159/2 E; 425/203, 205

[56] References Cited

U.S. PATENT DOCUMENTS

| | | | |
|---|---|---|---|
| 3,749,374 | 7/1973 | Buchheit | 366/84 |
| 3,749,375 | 7/1973 | Hermann | 366/83 |
| 3,917,507 | 11/1975 | Skidmore | 366/75 |
| 4,107,787 | 8/1978 | Ocker | 366/75 |

*Primary Examiner*—Robert W. Jenkins
*Attorney, Agent, or Firm*—Sughrue, Rothwell, Mion, Zinn and Macpeak

[57] ABSTRACT

A biaxial vent extruder for processing of slurry-like waste fluids or radioactive waste fluids having a hopper cylinder having a solidifying substance port and a solidified substance port. A plurality of vent cylinders each having a vent port are provided with a plunger type scraper. An extruding cylinder having a single opening for a main screw is connected to the assembled vent cylinders. The main screw extends to the upstream end of the extruding cylinder and a sub-screw extends to the extruding cylinder. The screws each having a full flight engaging the other and a set of rings are mounted on the screws near the respective vent port inlets. The screws are rotated in different directions and inwardly with respect to the vent ports. Rotors may be mounted on the screws to break down solid particles.

6 Claims, 7 Drawing Figures

BIAXIAL VENT EXTRUDER

BACKGROUND OF THE INVENTION

This invention relates to a biaxial vent extruder applicable to the processing of waste fluid slurries, radioactive waste fluid or the like.

Recently, the problem of processing of radioactive waste fluid in a slurry has become acute. In the processing of these materials, it is most important to maintain safety conditions. Until the present time, maintenance on land in "vaults" and/or discharge into the ocean have been adopted as methods of processing radioactive waste substances. In these methods, waste substances must be solidified into a form suitable for maintenance or discharge. In general, low level radioactive waste substances are solidified in 200l drum cans. An initial solidifying method used is a cement solidifying type. Recently, asphalt solidifying, glass solidifying and plastic solidifying methods have been developed.

In view of the above developments, it is desired to process the radioactive substances with safety and at low cost.

One of solidifying processes of the radioactive substances, a prior art biaxial vent extruder apparatus, is shown in FIGS. 1 and 2 and well known. However, the prior art apparatus has the following defects.

1. Since the parallel screws extend to the extruding cylinder outlet end, the sealability of the extruding cylinder deteriorates and due to a negative pressure for degassing. Raw materials also tend to be clogged in the outlet thereof.

2. Since means for controlling the flow rate are not provided in each vent, it is very difficult to control the amount of evaporation of each vent port. As a result, the degassing efficiency and hence operationability deteriorate.

3. Since the rotational direction of the parallel screws is the same, the solidification shape of the solidified substances stagnates on one side of the vent port walls. Since carry-over of the solidifying and solidified substances are large, the physical characteristics of the final products are unstable.

4. The solidifying substances and solidified substances are separately introduced into a hopper cylinder. If the solidified substances are introduced to the reduction device side, there is a possibility that the solidified substances will leak from the ground.

5. Since the rotational rate of the screw cannot be maintained at more than 300 rpm, the evaporation efficiency of the waste fluid deteriorates. Therefore, the size of the apparatus tends to become unduly large.

In addition to the radioactive waste fluid a plating waste fluid also in slurry form presents a problem of processing in view of the threat of public pollution. For processing, generally, vacuum dehydration is carried out to thereby produce a sludge. The plating waste fluid is heated and vaporized by the biaxial vent extruder in the same manner as the radioactive waste fluid so that the waste fluid can be solidified using an asphalt. However, the processing using the biaxial vent extruder is disadvantageous as in the processing of the radioactive substances.

SUMMARY OF THE INVENTION

Accordingly, an object of the present invention is to provide an improved biaxial vent extruding apparatus used for a solidifying process.

Another object of this invention is to provide an extruding apparatus for processing particularly waste slurry fluids such as radioactive waste fluid and plating waste fluid.

Still another object of this invention is to provide a biaxial vent extruding apparatus overcoming the above noted defects inherent in the prior art devices.

A biaxial vent extruder according to the present invention is provided to achieve the foregoing and other objects, overcoming the defects inherent to the prior art biaxial vent extruder. In consideration of the above describde items of the defects of the prior art devices, the present extruder is constructed corresponding thereto as follows:

1. A single extruding portion cylinder is employed. As a result, the sealability of the extruding portion cylinder is enhanced and at the same time, a constant amount and stable extrusion is possible.

2. A ring is inserted into a screw in the upstream portion of each vent portion. This causes the hold-up amount of the flow rate to be controlled and also the evaporation amount of each vent port is controlled.

3. The rotational directions of two screws are different from each other so that the screws are engaged with each other and the screws are rotated inwardly with respect to the vent ports. Masses of the solidifying and solidified substances are possibly reduced and stagnation thereof are prevented.

3. Plunger type scraping devices are provided upper portions of respective vent port. Hence, solidifying and solidified substances precipitated on the wall of the respective vent portions are scraped and removed therefrom.

4. An inlet for raw materials of solidifying substances is provided on the side of reduction device and in a feeding port formed in the hopper cylinder. Leakage of solifidied substances from the ground is prevented.

5. By the above-described application, the high rotational rate of the screws can be maintained at more than 300 rpm. For this reason, the total thermal conductivity is enhanced and the surface renewal formation is accelerated to thereby enhance the vaporization characteristics.

Referring now to the drawings, and the detailed description that follows, the present invention will be hereinafter described.

DESCRIPTION OF THE PREFERRED EMBODIMENTS

Figure 1:
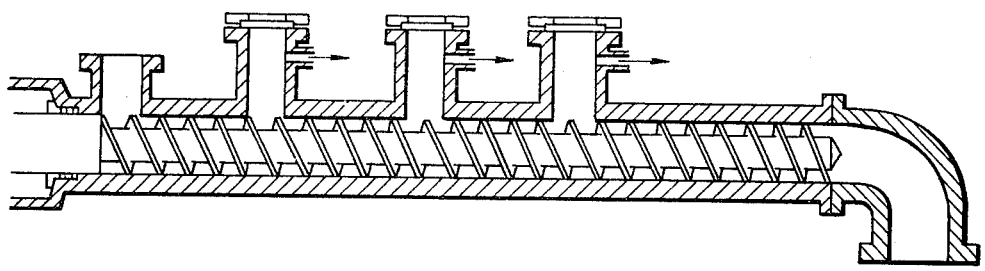
FIG. 1 shows a longitudinal side view of the prior art biaxial extruder.
Figure 2:
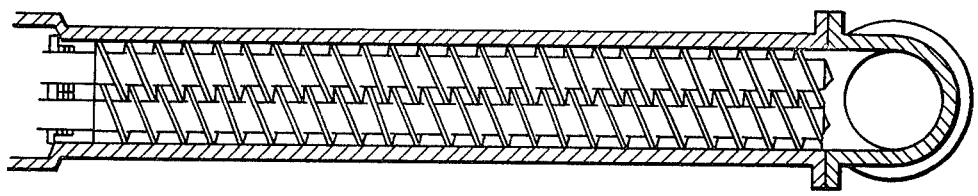
FIG. 2 shows a longitudinal plan sectional view of the extruder shown in FIG. 1.
Figure 3:
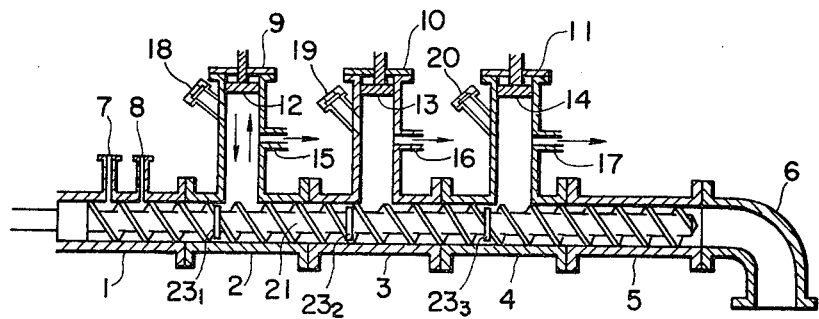
FIG. 3 shows a longitudinal side sectional view of the extruder according to the present invention.
Figure 4:
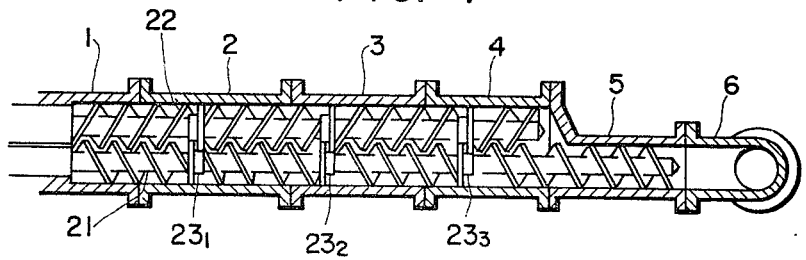
FIG. 4 shows a longitudinal plan sectional view of the extruder of FIG. 3.
Figure 5:
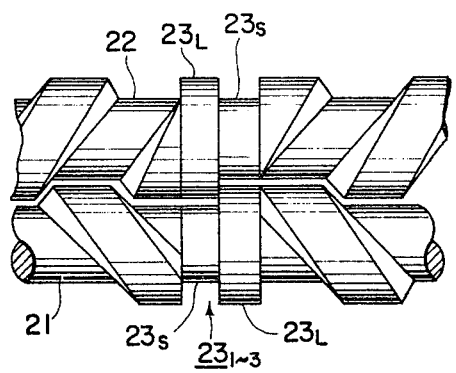
FIG. 5 shows an enlarged partial view of the extruder of FIGS. 3 and 4.

FIGS. 3 to 7 show one embodiment of the present invention. As shown in FIGS. 3 and 4, the extruder 5 according to the present invention is composed of a primary electric motor (not shown) for driving screws, a reduction device (not shown), a cylinder and the screws. The cylinder is composed of a hopper cylinder 1 provided with jackets for heating or cooling, a plurality of vent cylinders 2, 3 and 4, and an extruding outlet cylinder 5 connected to an extruding nozzle 6. Incidentally, the hopper cylinder 1 and the vent cylinders 2, 3 and 4 are made for a biaxial type while only the extruding cylinder 5 is made for a single type. This is shown in FIG. 4. Feeding ports 7 and 8 for solidifying and solidified substances such as raw materials are aligned longitudinally in line on the axes of the cylinders. The solidifying substance feeding port 7 is provided on the reduction device side. Vent ports 9, 10 and 11 are vertically mounted on the respective cylinders 2, 3 and 4. Plunger type scraper devices 12, 13 and 14 for scraping the solidifying and solidified substances on the walls of respective vent ports are provided in the vent ports. Absorbing ports 15, 16 and 17 are formed in the respective vent ports 9, 10 and 11 so that the inner portions of the vent ports 9, 10 and 11 are degassed by applying vacuum pressures thereto. Observing windows 18, 19 and 20 are provided for the respective vent ports. The behavior of the raw materials can be observed through those ports.

A primary screw 21 and a secondary screw 22, rotated in the opposite direction to each other, are inwardly engaged with each other and are disposed in the cylinders 1 to 5. The subscrew 22 extends only through cylinder 4. Each screw is composed of a full-flight and a rotor (not shown). In addition, respective screws are provided with a set of annular rings $23_1$, $23_2$ and $23_3$ before (upstream) the respective vent ports 9, 10 and 11 (refer to FIG. 5). Each annular ring $23_1$, $23_2$ and $23_3$ is composed of two large rings $23_L$ each having a diameter equal to that of the screw 21 or 22, and two small rings $23_S$ each having a diameter so that the small ring $23_S$ is tangent to the outer peripheral portion of the large ring $23_L$. The large ring $23_L$ provided on the primary screw 21 confronts the small ring $23_S$ provided on the secondary screw 22 and at the same time the large rings $23_L$ of the primary and secondary screws are partially overlapped adjacent thereto.

Figure 6:
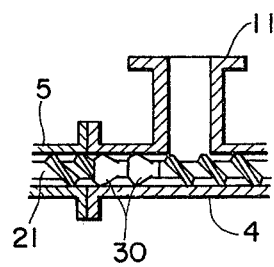
FIGS. 6 and 7 are a longitudinal sectional view and a plan view of the rotors according to the present invention, respectively.
Figure 7:
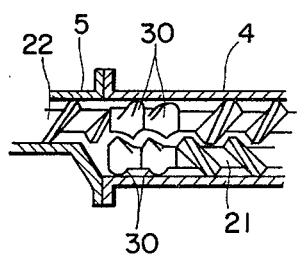

Rotors 30 are, as shown in FIGS. 6 and 7, are disposed after (downstream) the vent cylinder 4 where the waste fluid is completely degassed and before the extruding cylinder 5. Some of the radioactive waste fluid may contain ion exchange resins. Such waste fluid has large dimensions (shapers of 0.4 to 0.6 mm in diameters) in comparison with Glauber's salt and boric acid. Further, since it is impossible to make them elastic by heat, it is necessary to break them up into the dimensionn of about 0.5 mm by shearing in order to completely eliminate the invasion of the radioactive substances. Therefore, the above-described rotors 30 serve to include the diameter of the radioactive substances when the residual water composition is removed from the waste fluid. Accordingly, the rotors are not necessarily provided, but used according to the kinds of the solidified substances.

The apparatus is constructed as mentioned above, and the operation thereof will hereinafter be described.

The primary and secondary screws 21 and 22 are rotated at high speed, for example 300 to 800 rpm, by the main electromotive motor and the reduction device and the respective vent ports 9, 10 and 11 are maintained at a predetermined negative pressure (vacuum) through the absorbing ports 15, 16 and 17. Under such circumstances, solidifying substances such as thermoplastic synthetic resin, thermosetting resin, asphalt and the like are introduced through the solidifying substance feeding port 7 while the solidified substances such as slurrylike waste fluid (plating and pulp waste fluid or the radioactive waste fluid (Glauber's salt and boric acid water are introduced through the solidified substance feeding port 8. Both are continuously fed thereinto.

Thereafter, both materials are mixed by rotated screws 21 and 22, and water contained therein are evaporated through the vent ports 9, 10 and 11 so that mixed solidified substances from which the water is evaporated is stably and continuously discharged from the extruding portion cylinder 5 to the extruding nozzle 6 by the rotation of the primary screw 21. In this case, since the primary and secondary screws 21 and 22 are inwardly rotated in the opposite direction to each other, the raw materials in the cylinders 1 to 4 are advanced while forming an 8-shaped movement, to thereby enhance uniform stirring and shearing.

Therefore, the evaporation ability of the apparatus according to the present invention is remarkably enhanced in comparison with the prior art biaxial extruder in which the screws are rotated in the same direction. At the same time, in the present apparatus the surface removal of the materials therein is satisfactorily achieved, and the rotations of the screws are maintained at 300 to 800 rpm. Also, for this reason, the surface renewal formation effect, the heat generated due to shearing, and the thin diaphragm phase forming effect, are enhanced. Therefore, the total thermoconductive coefficient of the cylinder surfaces is also enhanced. Furthermore, though the inward different rotations of the screw, the grade of the vacuum is enhanced, vent-up is not likely to occur. Consequently, the vaporization ability of the present apparatus is more than twice the conventional apparatus.

The flashing effect of the inlet portions of the vent ports 9, 10 and 11 is also increased to contribute to the vaporization ability. Further, since the rings 23 are disposed before (upstream) the respective vent ports 9, 10 and 11 in the screws 21 and 22, the pressure balance between the front and rear thereof is achieved and the flow rate is controlled. This enables stable extruding to take place while enhancing the vaparization ability.

According to the present invention, the apparatus has the following effects.

(1) By employing a single discharging cylinder 5, the necessary length of the discharge cylinder for sealing can be reduced as two-thirds of the complete biaxial extruder. At the same time the grade of the vacuum can be increased to thereby remarkably enhance evaporation, and achieve a constant amount and stable extrusion.

(2) Since a set of rings $23_1$, $23_2$ and $23_3$ are disposed on the screws 21 and 22 just upstream of the respective vent ports, the pressure balance between front and rear portions of the rings is maintained thereby achieving stable extrusion and the flashing effect is enhanced. This also allows for the control of the hold-up amount of the solidifying and solidified substances in the inlets of the vent portions.

(3) Since the screws 21 and 22 are rotated in the opposite direction to each other and inwardly with respect to the vent portions, the adherence of the solidifying and solidified substances to the vent wall is reduced.

(4) Since plunger type scraper means 12 to 14 are provided in the upper portions of the respective vent portions, it is possible to clean the waste adhesives on the inner walls of the vent portions even during the driving condition. Hence, the physical characteristics of the substances are stable.

(5) Since the solidifying substance feeding port 7 is provided on the reducing means side, the escape of the solidified substances is completely eliminated. The stoppage of operations or dangerous work are not required.

It is apparent that modifications of this device can be realized without departing from the essential scope of the invention.

What is claimed is:

1. A biaxial vent extruder for processing slurry-like waste fluid or radioactive waste fluid comprising:
   a hopper cylinder having a solidifying substance port and a solidified substance port;
   a plurality of vent cylinders each having a vent port provided with plunger type scraper means;
   an extruding cylinder having a single opening for a main screw, said hopper vent and extruder cylinders being continuously connected;
   said main screw extending to the upstream end of the extruding cylinder;
   a sub-screw extending through said hopper and vent cylinders and terminating prior to the extruding cylinder, said screws each having a fullflight for engagement with the other; and
   a set of rings being mounted on said main screw and said sub-screw near respective vent port inlets, said screws being rotated in opposite directions and inwardly with respect to the vent ports.

2. An apparatus as claimed in claim 1 wherein said set of rings comprise two large rings each having a diameter equal to that of the respective screw to which it is mounted and two small rings each having such a diameter that the small ring is in contact with the outer peripheral portion of the large ring; a large ring and small ring provided on each of the main and sub-screws so that the large and small rings confront each other and the large rings of respective screws are adjacent to and overlap each other.

3. An apparatus as claimed in claims 1 or 2, further comprising at least one set of rotors disposed on said main screw and sub-screw upstream of extruding cylinder.

4. An apparatus as claimed in claims 1 or 2, wherein a rotational speed of each screw is in the range of 300 to 800 rpm.

5. An apparatus as claimed in claim 1 wherein each of said vent ports further comprises an absorbing port and an observation window.

6. An apparatus as claimed in claim 1 further comprising a set of rotors disposed on each screw in a vent cylinder upstream of said extruding cylinder.

* * * * *